United States Patent [19]
Adams et al.

[11] 3,812,236
[45] May 21, 1974

[54] REMOVAL OF AMMONIA AND ORGANIC IMPURITIES FROM AN AMMONIA PLANT EFFLUENT

[75] Inventors: Harry A. Adams, Bedford Heights; Kumar Kunchal, North Ridgeville; James L. Callahan, Bedford Heights, all of Ohio

[73] Assignee: The Standard Oil Company, Cleveland, Ohio

[22] Filed: June 22, 1972

[21] Appl. No.: 265,163

[52] U.S. Cl.................. 423/237, 423/232, 423/245
[51] Int. Cl............................................ B01d 53/34
[58] Field of Search .......... 423/220, 232, 233, 237, 423/238, 245, 437, 438

[56] References Cited
UNITED STATES PATENTS
1,953,938 4/1934 Jaeger................................ 423/237
2,801,898 8/1957 Malcus............................... 423/237

*Primary Examiner*—Earl C. Thomas
*Attorney, Agent, or Firm*—Herbert D. Knudsen; Sherman J. Kemmer; John F. Jones

[57] ABSTRACT

Ammonia and organic impurities are removed from an ammonia plant effluent consisting mainly of steam by treating the effluent with an oxidation catalyst which oxidizes the impurities to harmless products of nitrogen, water and carbon dioxide.

5 Claims, 1 Drawing Figure

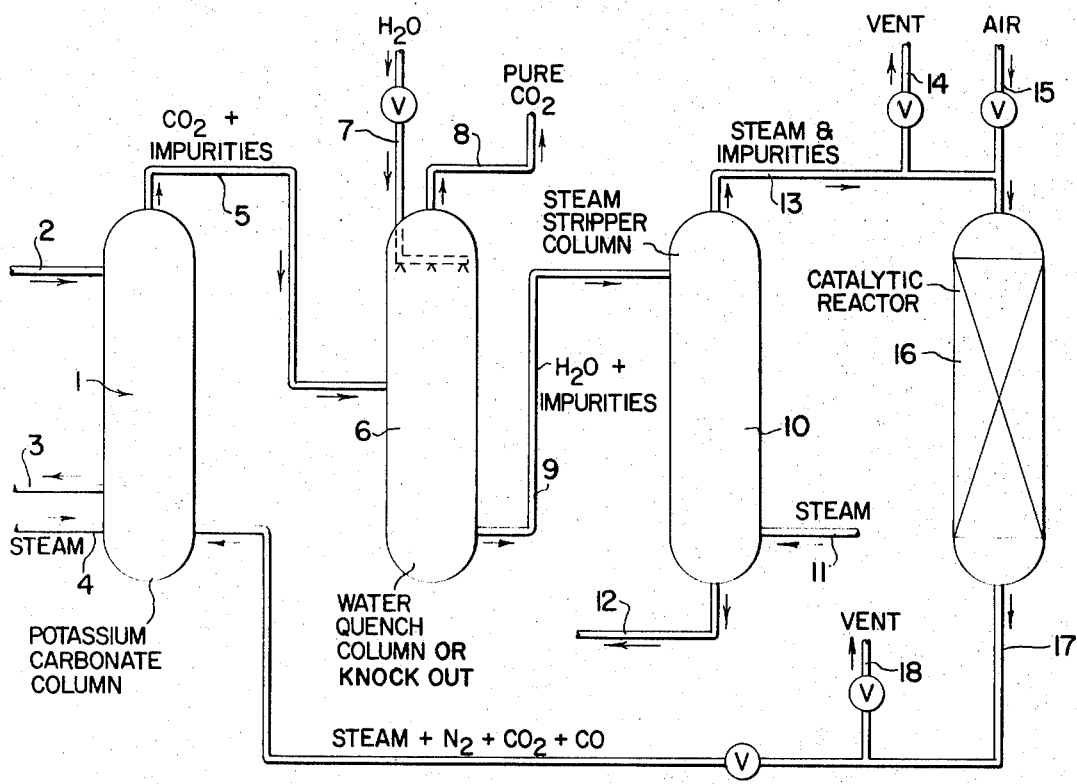

REMOVAL OF AMMONIA AND ORGANIC IMPURITIES FROM AN AMMONIA PLANT EFFLUENT

BACKGROUND OF THE INVENTION

The use of a potassium carbonate solution to separate carbon dioxide from a gaseous stream is well known. In addition to the carbon dioxide, the potassium carbonate solution also entraps ammonia and organic impurities. These impurities are stripped along with the carbon dioxide and found in the impure carbon dioxide. The nature of these impurities, of course, is directly related to the process in which the carbon dioxide is generated. For example, in an ammonia plant where methane is catalytically oxidized in the presence of steam and air to form hydrogen and carbon dioxide, the impurities in the potassium carbonate solution are extraneous low molecular weight organic compounds, such as alcohols and aldehydes. Also found in the solution is ammonia formed from the hydrogen produced in the reforming and the nitrogen from the air. These impurities are stripped from the carbonate solution along with the carbon dioxide.

Various methods for using such a potassium carbonate separation are shown in U. S. Pat. Nos. 2,886,405, 3,181,929 and 3,563,695, U. S. Pat. No. 3,563,696 and British Pat. No. 1,084,526. The separation process of the art is exemplified by the first part of the figure in the present invention.

Referring to the FIGURE of the present invention, in the potassium carbonate column, 1, potassium carbonate solution having a high concentration of carbon dioxide and impurities enters the column through entrance, 2, the solution flows through the column and exits the column at exit, 3. During the circulation through the column, the potassium carbonate solution is subjected to steam stripping from steam inlet, 4. This input of heat strips the carbonate solution of the carbon dioxide, ammonia and organic impurities. These materials along with some of the steam leaves the column through conduit, 5. Conduit, 5, takes the gaseous stream to the water quench column, 6. In this column, water is sprayed from inlet, 7, into the gas stream. This water quench removes ammonia and the other water soluble or condensed impurities, leaving an essentially pure carbon dioxide stream which leaves the water quench column, 6, through exit, 8. When the water quench column, 6, is a knock out, 6, there is no water flow and only the condensibles are recovered. The liquid containing the impurities in the bottoms water quench column, 6, is taken from the column through conduit, 9, to the steam stripper column, 10. In the steam stripper column, 10 steam enters through entrance, 11, to strip the impurities from the contents of the column to give essentially pure water which is taken out of the steam stripper column, 10, through exit, 12. The stripped impurities plus the steam carrier is channeled into conduit, 13.

In the art this stream in conduit, 13, was either vented to the atmosphere or charged to the sewer as shown by vent, 14, or recycled to the potassium carbonate column, 1, by a conduit which is not shown in the FIGURE. This stream in conduit, 13, is the subject of the present invention.

In the art, the venting or disposal of the stripper effluent through vent, 14, is undesirable. This discharge of a combination of steam and impurities is essentially eliminated in the present invention.

When the stream in conduit, 13, is recycled to the potassium carbonate column, the concentration of these impurities are increased so that the columns may be overloaded with impurities. This problem is also overcome by the process of the invention.

SUMMARY OF THE INVENTION

It has now been discovered in the present invention that the impure gas stream in conduit, 13, containing steam and about 0.1 percent to about 10 percent by volume of ammonia or organic compounds of up to about six carbons or mixtures thereof is conveniently converted to a stream containing essentially no detrimental impurities by contacting the impure stream with a catalyst selected from the group consisting of oxidation catalysts containing the oxides of copper, iron, manganese, bismuth, nickel, cobalt, uranium, molybdenum, vanadium, chromium, tungsten, palladium, platinum, silver, zinc, alkali metals, alkaline earth metals, tin and antimony or mixtures thereof at a temperature of about 200° to about 800° C.

The preferred practice of the present invention is shown in the FIGURE. As was explained in the *Background of the Invention*, the art vents steam and impurities to the atmosphere or to the sewer through vent, 14, or recycles the impurities to the potassium carbonate column, 1, by a conduit which is not shown. The present invention is an improvement on the use of the gas stream in conduit, 13. Vent 14, is closed in the present invention.

The stream in conduit, 13, is treated to convert the impurities to carbon oxides, water and nitrogen. If the stream is vented to the atmosphere or sewer, no adverse effects realized. Also, through the treatment of the invention, the stream may be recycled to the potassium carbonate column, 1, and the efficiency of the process is increased.

The process of the invention is carried out by preferably injecting molecular oxygen usually in the form of air through conduit, 15, into the gaseous stream in conduit, 13. This mixture is then fed into the catalytic reactor, 16. The catalytic reactor, 16, contains an oxidation catalyst of the invention.

The catalytic reactor, 16, is operated under conditions such that ammonia is converted to nitrogen and hydrogen, and the organic impurities are converted to carbon oxides and water. Of course, in the presence of the catalyst and molecular oxygen, any hydrogen formed from the ammonia is almost instantaneously converted to water under the conditions of the reaction. Thus, the gas stream leaving the catalytic reactor through conduit, 17, contains steam, nitrogen, oxygen and carbon oxides almost all of which are in the form of carbon dioxide. This stream leaving the catalytic reactor has essentially the same temperature as the temperature of the catalytic reaction.

The gas stream in conduit, 17, would not deleteriously affect the environment, and therefore, it may be released through vent, 18. In the preferred practice of the invention, however, the heat of the stream in conduit, 17, is preferably used by returning the heat to the potassium carbonate column as heat input to assist in stripping additional carbon dioxide and impurities or as heat input to preheat the gas coming into the catalytic reactor.

The central aspect of the present invention is the use of an oxidation catalyst to eliminate the significant problems associated with the known methods. As noted, these catalysts may vary widely in composition. Essentially any catalyst that can accomplish the requisite oxidations described above can be employed.

As a broad class, any of the oxides or mixtures thereof described in the broad discussion of the invention can be employed. Preferred in the present invention are catalysts which contain copper oxide, with those catalysts which contain active ingredients consisting essentially of copper oxide being preferred because of their desirable cost and proven ability in the process of the present invention.

The active ingredients of the catalyst may be used along or preferably are used on an inert support. Suitable supports include silica, alumina, zirconia, titania, silicon carbide, diatomaceous earth, pumice and the like.

As noted above, the impurities in the system can be ammonia, organic impurities having up to about six carbon atoms. These impurities as noted in the FIGURE are limited to those which are removed from the carbon dioxide stream by the water wash. In an ammonia plant using natural gas as a feed, the impurities are essentially limited to ammonia, methanol, formaldehyde, formic acid and small amounts of organic compounds having two carbons. Removal of a mixture of these impurities in the present invention is especially preferred.

The impurities are removed from a gaseous stream containing at least about 90 percent by volume of steam and at least about 0.1 percent to about 10 percent by volume of impurities. Preferred streams contain less than about 5 percent by volume of impurities. This stream is contacted with the catalysts under conditions which converts the impurities to nitrogen, water and carbon dioxide.

The conditions of the catalytic oxidation vary widely as different catalysts are employed and as different impurities are found in the system. As a general rule, relatively high temperatures from about 400° to about 1,400° F. are used, with temperatures above 600° F. being normally required for best results. For the use of the preferred catalyst containing copper oxide temperatures of about 700° to about 1,000° F. give a desirable reaction. The reaction may be conducted at atmospheric, super atmospheric or subatmospheric pressure, with atmospheric pressure being preferred. The contact time may vary widely, but contact times of less than about 30 seconds normally give acceptable conversion of the impurities.

One very important aspect of the catalysts containing copper oxide is their ability to take slugs of organic materials without allowing significant amounts of breakthrough. Also, these catalysts continue to be effective even in the absence of oxygen. Thus, if there were an interruption in the oxygen feed, there would be continued conversion of the pollutants to harmless products.

SPECIFIC EMBODIMENTS

Example 1 — CO$_2$ Recovery System

In an ammonia plant which utilizes a natural gas feed, a mixture of carbon dioxide, nitrogen and oxygen along with minor amounts of ammonia and organic materials is obtained. This mixture of gases is fed into a CO$_2$ recovery system which uses a potassium carbonate solution to absorb the CO$_2$. This CO$_2$-rich solution is then transferred to a separate chamber where the CO$_2$ is stripped from the solution. This CO$_2$ obtained has impurities such as methanol, ammonia and other organic materials. This gas stream is transferred to a knock out drum where the condensibles are recovered and transferred to the steam stripper. The gas stream from the knock out drum is transferred to a water quench column where water is sprayed into the gas to purify the CO$_2$ and give an aqueous stream containing impurities. This aqueous stream is transferred to the stripper. In the stripper, steam is passed through the liquid to strip the impurities from the liquid thereby obtaining a gaseous stream consisting of steam containing 2,500 ppm. of methanol and 8,450 ppm. of ammonia.

A sample of this gas stream is recovered for reaction according to the invention. A catalytic reactor consisting of a metal tube with an inlet for reactants and an outlet for products was constructed. Into this reactor was charged 205 g. of a catalyst containing 10 percent copper oxide on alumina which is sold as one-eighth pellets under the trade name Cu 0803 by the Harshaw Catalyst Company.

The catalytic reactor was operated at 900°–1010° F., and the pressure was 20 p.s.i.g. The gas stream from the CO$_2$ recovery system was mixed with 4 percent of air and passed through the reactor at an hourly space velocity of 2,000.

The effluent of the reactor was analyzed and it was observed that no methanol or other organic impurities were found and only 8 ppm. of NH$_3$ were unreacted.

Examples 2–7 — Reactions of Various Gas Compositions over Cu 0803

In the catalytic reactor of Example 1, various gas compositions were reacted under various conditions. The feeds, conditions and results are given in Table I.

TABLE I.—Reaction of Steam Containing Various Impurities

| Example | Temp., °F. | Space velocity | Pressure, p.s.i.g. | Feed, ppm. NH$_3$ | Feed, ppm. CH$_3$OH | Product, ppm. NH$_3$ | Product, ppm. CH$_3$OH |
|---|---|---|---|---|---|---|---|
| 2 | 890 | 4000 | 0 | 4200 | 2988 | 1140 | 0 |
| 3 | 765 | 2000 | 0 | 4300 | 2488 | 1860 | 0 |
| 4 | 900 | 1000 | 0 | 4200 | ......... | 80 | ......... |
| 5 | 900 | 9000 | 20 | 1030 | 572 | 185 | 0 |
| 6 | 900 | 6000 | 20 | 3800 | 2500 | 105 | 0 |
| 7 | 800 | 4000 | 40 | 3800 | ......... | 941 | ......... |

Example 8 — Ability of Copper Oxide to Withstand Upsets

As mentioned in the specification, there are two types of upsets that could adversely affect the conversion of the impurities to harmless products. An unusually large amount of impurities may come through or the oxygen may be shut off. In either case, the amount of oxidation required exceeds the molecular oxygen present. It is therefore necessary for the catalysts to supply this oxygen.

Using the catalyst and reactor of Example 1, steam containing 1,800 ppm. $NH_3$ and 1,000 ppm. of $CH_3OH$ was passed over the catalyst at a temperature of 900° F. and a feed rate of 960 cc./hr. No oxygen was added to the feed. The analysis of the product at various times is given in Table II.

TABLE II

Catalytic Reaction of Cu 0803 Without Oxygen Addition

| Time, sec. | Effluent Composition, ppm. | |
| --- | --- | --- |
| | $NH_3$ | $CH_3OH$ |
| 0 | 720 | <5 |
| 3 | 1220 | <5 |
| 9 | 1450 | <5 |
| 18 | 1630 | <5 |
| 39 | 1770 | <5 |

The reaction was continued until 3,000 volumes of gas had been passed through the reactor. At that point, the amount of methanol fed was still 50 percent converted and the unconverted methanol effluent was only 500 ppm.

In the same manner as described above, other oxidation catalysts, such as the oxides of copper and chromium; copper and zinc; copper and iron; copper, manganese and iron; nickel, molybdenum and cobalt; nickel, bismuth, uranium and antimony; and potassium, iron, bismuth and molybdenum are used to obtain the desirable results of the present invention. Also in the same manner as shown for ammonia and methanol, other impurities such as formaldehyde, formic acid, acetaldehyde, acetic acid, methylamine and diethylamine, are converted to harmless products.

We claim:
1. In the process consisting of
   a. stripping a hot aqueous potassium carbonate solution containing absorbed carbon dioxide, ammonia and organic compounds to obtain a gaseous stream containing water, carbon dioxide, ammonia or organic compounds of up to about six carbons or mixtures thereof and other materials;
   b. subjecting said gas stream to condensation or an aqueous wash to remove water, ammonia and organic impurities to obtain an impure aqueous stream containing ammonia, said organic impurities or mixture thereof and a gaseous carbon dioxide stream; and
   c. steam stripping said impure aqueous stream to obtain a stripped gaseous stream containing steam and about 0.1 to 10 percent by volume of ammonia or said organic impurities, the improvement comprising:
      oxidizing the ammonia or organic impurities or mixture thereof to obtain a pure gaseous stream with an oxidation catalyst containing an oxide of copper at a temperature of about 400° to about 1,400° F.

2. The process of claim 1 wherein said impure aqueous stream is contacted with said oxidation catalyst at a temperature of about 700° to about 1,000° F.

3. The process of claim 1 additionally comprising adding molecular oxygen to said stripped gaseous stream prior to contact with the oxidation catalyst.

4. The process of claim 1 additionally comprising the step of recycling said pure gaseous stream to the hot potassium carbonate recovery column.

5. The process of claim 1 wherein said stripped gaseous stream contains less than about 5 percent by volume of impurities.

* * * * *